United States Patent
Gomes (10) Patent No.: US 9,800,403 B1
(45) Date of Patent: Oct. 24, 2017

(54) MESSAGE PROCESSING USING EXTENDED OUTPUT FUNCTIONS

(71) Applicant: International Business Machines Corporation, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 15/282,692

(22) Filed: Sep. 30, 2016

(51) Int. Cl.
*G06F 11/30* (2006.01)
*G06F 12/14* (2006.01)
*H04L 9/06* (2006.01)

(52) U.S. Cl.
CPC ........ *H04L 9/0643* (2013.01); *H04L 2209/20* (2013.01)

(58) Field of Classification Search
None
See application file for complete search history.

(56) References Cited

U.S. PATENT DOCUMENTS

| | | | | |
|---|---|---|---|---|
| 6,243,470 B1 * | 6/2001 | Coppersmith | ........ | H04L 9/0625 380/259 |
| 6,370,247 B1 * | 4/2002 | Takaragi | ............... | H04L 9/0643 380/28 |
| 2002/0191792 A1 * | 12/2002 | Anand | ................... | H04L 9/0643 380/255 |
| 2008/0010463 A1 * | 1/2008 | Eastlake | ............... | H04L 9/0643 713/181 |
| 2012/0121083 A1 * | 5/2012 | You | ........................ | H04L 9/0631 380/28 |
| 2014/0019771 A1 | 1/2014 | Emmett et al. | | |
| 2016/0013932 A1 | 1/2016 | Karaki et al. | | |
| 2016/0119133 A1 | 4/2016 | Ciet et al. | | |

OTHER PUBLICATIONS

J. L. G. Pardo, "More Maple Code—introduction to Cryptography with maple," in Introduction to Cryptography with Maple, 2015. [Online]. Available: https://sites.google.com/site/cryptomaple/more-maple-code. Accessed: Dec. 25, 2016.*

* cited by examiner

*Primary Examiner* — Michael R Vaughan
*Assistant Examiner* — Vadim Savenkov
(74) *Attorney, Agent, or Firm* — Cantor Colburn LLP; Steven Chiu (57) ABSTRACT

Systems, methods, and computer-readable media are disclosed for processing and message padding an input message as well as processing an extended output message (EOM) in a manner that ensures that the input message and the padded message are processed only a single time, thus avoiding generation of an incorrect message digest. In addition, in those scenarios in which multiple padded message blocks are generated, the disclosed systems, methods, and computer-readable media ensure that all of the padded message blocks are processed.

20 Claims, 3 Drawing Sheets

MESSAGE PROCESSING USING EXTENDED OUTPUT FUNCTIONS

BACKGROUND

A hash function is a function that can be used to map data of an arbitrary size to data of a fixed size. The values returned by a hash function are typically referred to as hash values. A cryptographic hash function is a special class of hash functions that has certain properties that make it suitable for use in cryptography. In particular, a cryptographic hash function has the property of being a one-way function (i.e., a function which is infeasible to invert). Input data to a cryptographic hash function may be referred to as an input message and the output of the function may be referred to as a message digest.

The Secure Hash Algorithm (SHA) is a family of cryptographic hash functions published by the National Institute of Standards and Technology (NIST). Included among the SHA family of cryptographic hash functions are SHA-0, SHA-1, SHA-2, and SHA-3. The SHA hash functions differ in various aspects such as, for example, the size of the output in bits, the block size in bits, and so forth. Further, multiple variations of a particular SHA hash function may exist. For example, SHA-3 has a number of different variations such as SHA3-256 and SHA3-512 which differ, among other things, in the size of the output that they generate. SHA-3 also includes variants such as SHAKE128 and SHAKE 256 that are extended output functions (XOFs) that produce outputs of arbitrary size.

SUMMARY

In one or more example embodiments of the disclosure, a method for processing an input message using an extended output function is disclosed. The method includes determining a value of a binary parameter indicative of whether the extended output function has been executed a first time, determining a value of a first parameter indicative of a current length of an extended output message (EOM), and determining a value of a second parameter indicative of a current length of the input message. The method further includes processing one of the input message, a padded message, or the EOM based at least in part on at least one of the value of the binary parameter, the value of the first parameter, or the value of the second parameter.

In one or more other example embodiments of the disclosure, a system for processing an input message using an extended output function is disclosed. The system includes at least one memory storing computer-executable instructions and at least one processor configured to access the at least one memory and execute the computer-executable instructions to perform a set of operations. The operations include determining a value of a binary parameter indicative of whether the extended output function has been executed a first time, determining a value of a first parameter indicative of a current length of an extended output message (EOM), and determining a value of a second parameter indicative of a current length of the input message. The operations further include processing one of the input message, a padded message, or the EOM based at least in part on at least one of the value of the binary parameter, the value of the first parameter, or the value of the second parameter.

In one or more other example embodiments of the disclosure, a computer program product for processing an input message using an extended output function is disclosed. The computer program product includes a non-transitory storage medium readable by a processing circuit, the storage medium storing instructions executable by the processing circuit to cause a method to be performed. The method includes determining a value of a binary parameter indicative of whether the extended output function has been executed a first time, determining a value of a first parameter indicative of a current length of an extended output message (EOM), and determining a value of a second parameter indicative of a current length of the input message. The method further includes processing one of the input message, a padded message, or the EOM based at least in part on at least one of the value of the binary parameter, the value of the first parameter, or the value of the second parameter.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for processing and message padding an input message as well as processing an extended output message (EOM) in a manner that ensures that the input message and the padded message are processed only a single time, thus avoiding generation of an incorrect message digest. In accordance with example embodiments of the disclosure, the values of various parameters may be used to determine whether to process an input message block of an input message, a padded message block of a padded message, or an EOM block of an EOM for a given processing stage. Such parameters may include, without limitation, a parameter that indicates whether a processing function (e.g., an extended output function (XOF)) has been executed for a first time; a parameter that indicates a current length of the EOM; a parameter that indicates a current length of the input message; a parameter that indicates an initial length of the EOM; a parameter that indicates a length of input message blocks in the input message; and so forth. As will be described in more detail hereinafter, the values of these various parameters may be compared and adjusted (e.g., decremented) at each processing stage to determine whether to process a message block of the input message, the padded message, or the EOM. It should be appreciated that length may be measured in number of bytes, number of bits, or the like.

Figure 1:
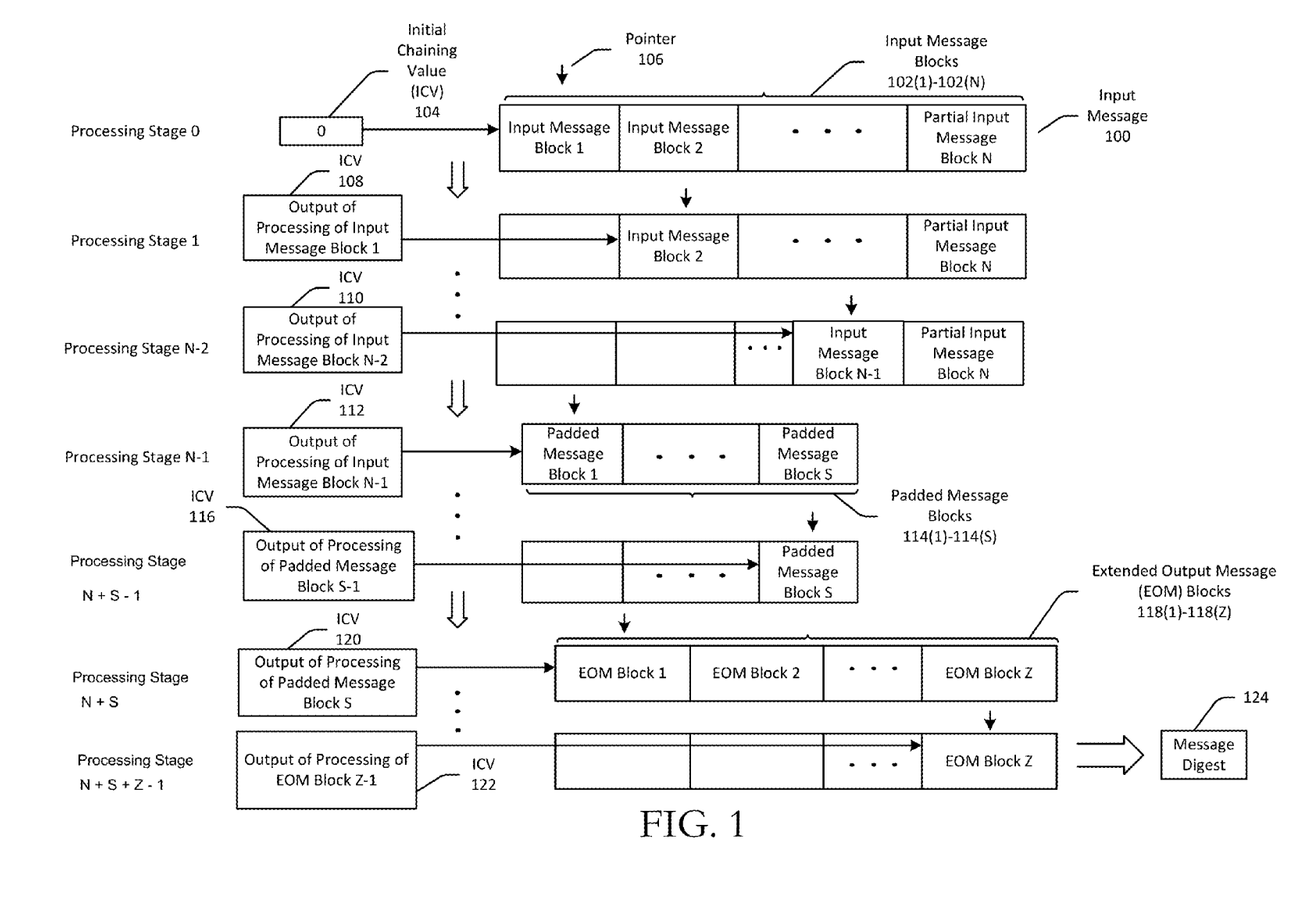
FIG. 1 is a schematic block diagram that provides a high-level overview of the processing and message padding of an input message using an extended output function.

FIG. 1 is a schematic block diagram that provides a high-level overview of processing and message padding of an input message using an extended output function. FIG. 1 depicts an input message 100 that may contain input message blocks 102(1)-102(N). In certain example embodiments, each of the input message blocks 102(1)-102(N) may be populated with input data of the input message 100. Each of the input message blocks 102(1)-102(N) may have a size (i.e., a number of bytes available for storing input data) that is dependent on a function (e.g., an XOF) that will be used to process the input message 100. While the size of each input message block 102(1)-102(N) may vary based on the function, the size may be the same for a given function. For example, for the SHAKE variant of the SHA-3 algorithm, each input message block 102(1)-102(N) may be 168 (for SHAKE-128) or 136 (for SHAKE-256) bytes in size.

Further, in certain example embodiments, a last input message block populated with input data (e.g., input message block 102(N)) may be a partial input message block that is only partially populated with input data. In particular, partial input message block 102(N) may contain one or more bytes that each include one or more bits that do not contain input data of the input message 100. For example, assuming again that the input message blocks of the input message 100 are 8 bytes in size, input message block 102(N) may be a partial input message block that may contain input data in only 3 of the 8 total bytes available in the input message block 102(N). Further, in certain example embodiments, a last populated byte in the partial input message block 102(N) may be only partially populated with input data. In particular, a last populated byte of the input message block 102(N) may contain one or more bits that are not populated with input data (such bit(s) may be referred to herein as extra bit(s)). For example, input message block 102(N) may be a partial input message block having a last populated byte that contains input data in only 4 of the 8 bits in the byte, in which case, the last populated byte would contain 4 extra bits.

It should be appreciated that the term last populated byte as used herein refers to a last populated byte of an input message block that is at least partially populated with input data, and does not necessarily correspond to a last available byte in an input message block. For example, the partial input message block 102(N) may contain 10 bytes available for storing input data, but byte 8 may be the last populated byte, in which case, bytes 9 and 10 do not contain any input data. It should further be appreciated that the number of input message blocks (N) in the input message 100 that contain input data is less than or equal to a total number of blocks available in the input message 100 for storing input data.

In particular, in certain example embodiments, all of the input message blocks of the input message 100 may not store input data. For example, the input message 100 may contain 4 input message blocks available for storing input data, each of which is 8 bytes in size, but the input message may only contain input data in 2 of the 4 input message blocks. That is, each of the 8 bytes in 2 of the input message blocks may be populated with input data, but the other 2 input message blocks may contain no input data. In such a scenario, N would have a value of 2. Although not depicted in FIG. 1, even if N is less than the total number of available blocks, the input message 100 may not contain a partial input message block in those example embodiments in which each populated byte of the input message block 102(N) is fully populated with input data. Further, it should be appreciated that in those example embodiments in which the input message 100 does not contain a partial input message block, all bytes of all blocks of the input message 100 may be fully populated with input data.

In example embodiments of the disclosure, a hash function such as the SHAKE variant of the SHA-3 cryptographic hash function may be applied to the input message 100 to generate a message digest 124. In a first processing stage (Processing Stage 0), an initial chaining value (ICV) 104 may be combined with input data in input message block 102(1) to generate a combined input that is then processed in accordance the selected hash function. A pointer 106 may be provided to indicate a current input message block to be processed. In certain example embodiments, the ICV 104 at Processing Stage 0 may be a zero value that is then XORed with the input data in the input message block 102(1) to obtain the combined input. Having a zero value for the ICV 104 at Processing Stage 0 ensures that the combined input generated from XORing the ICV 104 with the input data in the input message block 102(1) is identical to the input data.

The input data in the input message block 102(1) (i.e., the result of XORing the ICV 104 having a zero value with the input data in the input message block 102(1)) may then be processed, and an output of the processing may be stored as ICV 108. The pointer 106 may then be incremented to a next input message block to be processed. Then, in a next processing stage (Processing Stage 1), the ICV 108 may be combined (e.g., XORed) with the input data in the next input message block of the input message 100 (i.e., input message block 102(2)) to generate a combined input. This combined input may then be processed at Processing Stage 1 to generate an output that may be stored as an ICV to be used during a subsequent processing stage (e.g., Processing Stage 2). The processing may continue in this manner (with the pointer 106 being incremented to the next input message block after each processing stage) until Processing Stage N−2 is reached, at which point, the output of the processing of input message block 102(N−2) (which is stored as ICV 110) may be combined (e.g., XORed) with the input data in input message block 102(N−1) to generate an output that is stored as ICV 112.

If input message block 102(N) is a partial input message block, message padding of the input message 100 may be performed after Processing State N−2 to append a padding signature to the input message 100. If, on the other hand, the last populated input message block 102(N) of the input message 100 is fully populated with input data, message padding of the input message 100 may instead be performed after input message block 102(N) is processed. Message padding may include generating one or more padded message blocks 114(1)-114(S), where S is greater than or equal to 1. The padded message blocks 114(1)-114(S) may contain the padding signature which, in certain example embodiments, may be generated in accordance with the KECCAK message padding technique of the SHA-3 cryptographic hash function.

In certain example embodiments, the number of available bytes/bits in the partial input message block 102(N) may be sufficient to store the entire padding signature, in which case, only a single padded message block may be generated. Further, in those example embodiments in which the input message 100 does not include a partial input message block, a single padded message block may be sufficient to store the padding signature. On the other hand, if the number of available bytes/bits in the partial input message block 102(N) is not sufficient to store the entire padding signature, one or more additional padded message blocks may be generated to store the remainder of the padding signature. In either scenario, if the input message block 102(N) is a partial input message block, the first padded message block that is generated (padded message block 102(1))—which may be the only padded message block that is generated—may contain the input data of the partial input message block 102(N) as well as at least an initial portion of the padding signature.

Once the padded message blocks 114(1)-114(S) have been generated, processing may continue with Processing Stage N−1. At Processing Stage N−1, output of the processing of input message block N−1 stored as ICV 112 may be combined with the data in padded message block 114(1) to generate a combined input. This combined input may be processed to generate an output that may be stored as an ICV for use in a subsequent processing stage. This process may continue until the output of processing of padded message block S−1 (ICV 116) is combined with the data in padded message block S to generate a combined input. This combined input may then be processed to obtain an output that may be stored as ICV 120. It should be appreciated that in those example embodiments in which the input message block 102(N) is not a partial input message block, the output of processing input message block 102(N) may instead be combined with the input data in padded message block 114(1) at Processing Stage N to initiate processing of the padded message blocks 114(1)-114(S).

In those example embodiments in which the input message 100 and the padded message blocks 114(1)-114(S) are processed using an XOF, an EOM containing one or more EOM blocks 118(1)-118(Z) may also need to be processed in order to obtain the final message digest 124. In particular, the output of processing of the last padded message block 114(S) may be combined (e.g., XORed) with the input in EOM block 118(1) to obtain a combined input that may then be processed to obtain an output. This output may then be used to process a subsequent EOM block 118(2). Processing of the EOM blocks 118(1)-118(Z) may continue in this manner until the output of processing of EOM block 118(Z−1) is combined with the input in EOM block 118(Z), and the combined input is processed to ultimately obtained the message digest 124.

In certain example embodiments, the number of padded message blocks 114(1)-114(S) that are generated may depend on whether the input message 100 includes a partial input message block, and if so, a number of bytes/bits available in the partial input message block for storing a padding signature. For example, if the input message 100 does not include a partial input message block, then a single padded message block 114(1) may be sufficient to contain the entire padding signature. In such a scenario, the padded message block 114(1) would not contain any input data from the input message 100. Further, even if the input message includes a partial input message block (e.g., partial input message block 102(N)), only a single padded message block 114(1) may be generated if the number of unpopulated bytes in the partial input message block are sufficient to store the padding signature. If, however, a number of available bytes/bits in the partial input message block is not sufficient for storing the entire padding signature, multiple padded message blocks 114(1)-114(S) may be generated.

In at least those scenarios in which multiple padded message blocks 114(1)-114(S) are generated, conventional techniques present a risk of failing to process all of the padded message blocks 114(1)-114(S), in which case, an inaccurate message digest would be generated. In particular, some conventional techniques may set a first binary parameter to indicate whether a function (e.g., an XOF) has been executed for a first time and a second binary parameter to indicate whether processing of the padded message blocks 114(1)-114(S) has begun. The first binary parameter may serve to ensure that message padding is only performed once for the input message 100. However, while the second binary parameter alone can indicate whether processing of the padded message blocks 114(1)-114(S) has begun, it cannot indicate whether processing of all of the padded message blocks 114(1)-114(S) has been completed. As such, while these conventional techniques may be suitable for byte-oriented input messages, they may be insufficient for ensuring that all padded message blocks 114(1)-114(S) are processed in at least those scenarios in which the input message is bit-oriented and there are multiple padded message blocks 114(1)-114(S).

In particular, the current padding signature for SHA-3 and SHAKE extension functions is at most 6-bits long. For a byte-oriented input message, the padding signature may be contained within single byte. The last byte-oriented input message block is either partially full or completely full. If the last byte-oriented input message block is partially full, then it has at least one unused (extra) byte and the entire padding signature would be contained within the unused (extra) byte. On the other hand, if the last byte-oriented input message block is completely full, then it has no unused (extra) byte and the entire padding signature would be contained in the next (empty) padded message block that would have only the padding signature. Thus for both cases, the total number of padded message blocks is only one.

For a bit-oriented message, however, there may be up to two padded message blocks. For example, if the last bit-oriented input message block is partially full and only a few unused (extra) bits are available (a number less than the number of bits in the padding signature), then the entire padding signature would be split across two padded message blocks. More specifically, a first part of the padding signature would be in the first padded message block containing the partially full input message block and the remainder of the padding signature would be in the second/next (empty) padded message block. If the padding signature later grows to be more than 8-bits, then the conventional techniques for ensuring that all padded message blocks of a byte-oriented message have been processed would not produce a desired result in all cases.

Example embodiments of the disclosure address at least the above-mentioned drawback associated with conventional input message processing techniques by providing a processing algorithm that ensures that the input message and the padded message are processed only a single time, thus avoiding generation of an incorrect message digest. In particular, in accordance with example embodiments of the disclosure, the values of various parameters may be compared and adjusted at each processing stage to determine whether an input message block of an input message, a padded message block of a padded message, or an EOM block of an EOM should be processed for that processing stage. More specifically, the values of these various parameters may indicate whether all input message blocks have been processed or whether one or more input message blocks remain to be processed; whether all padded message blocks have been processed or whether one or more padded message blocks remain to the be processed; and/or whether all EOM blocks have been processed or whether one or more EOM blocks remain to be processed.

Figure 2:
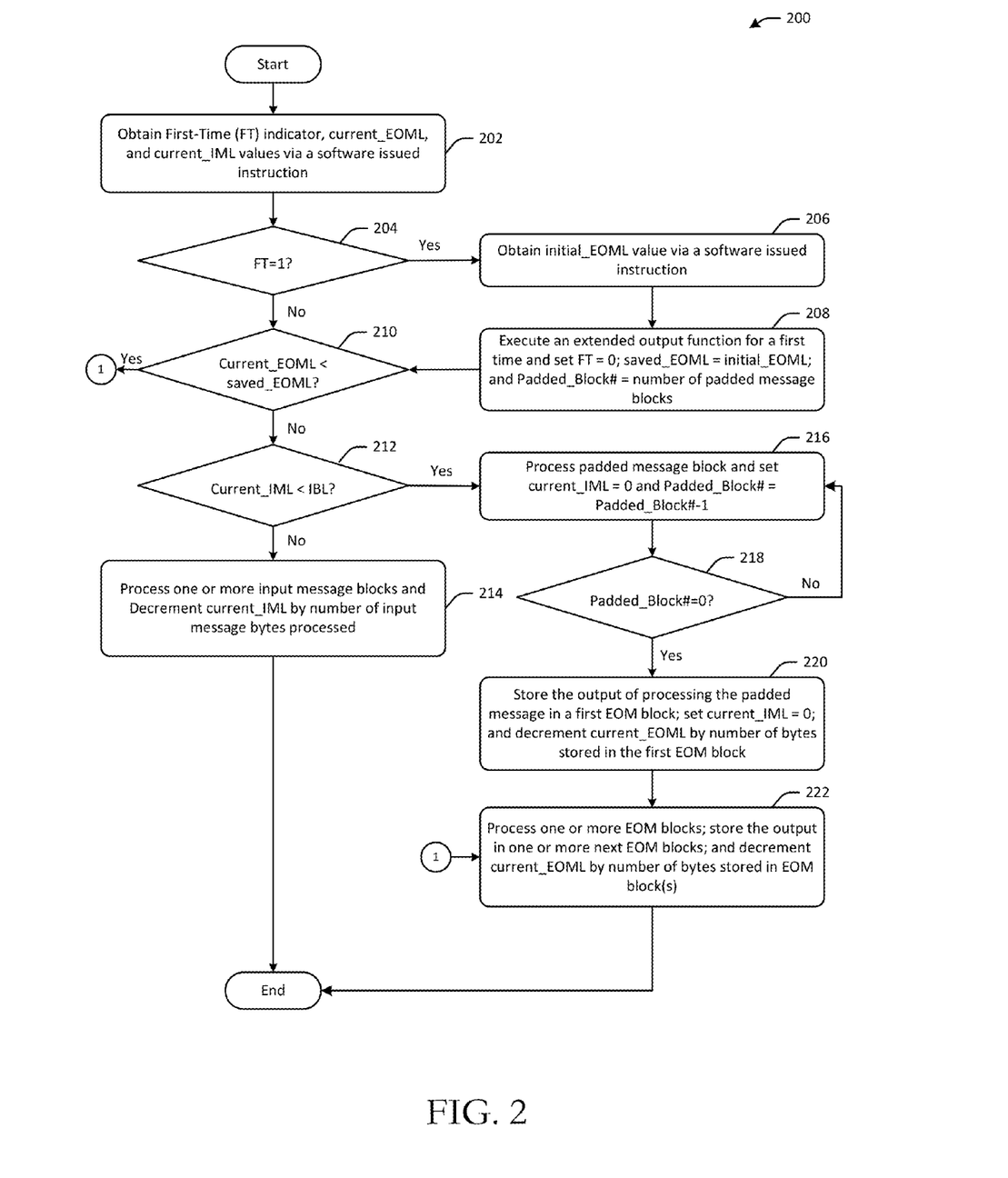
FIG. 2 is a process flow diagram of an illustrative method for processing an input message, a padded message, and an extended output message to generate a message digest in accordance with one or more example embodiments of the disclosure.

FIG. 2 is a process flow diagram of an illustrative method 200 for processing an input message, a padded message, and an extended output message to generate a message digest in accordance with one or more example embodiments of the disclosure. FIG. 2 may be described at times hereinafter in reference to FIG. 1. The method 200 may be performed iteratively, where each iteration may be triggered by a software issued instruction.

Each operation of the method 200 may be performed by one or more of the program modules depicted in FIG. 3, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit to cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 2, at block 202, computer-executable instructions of one or more XOF execution modules may be executed to obtain a value of a first-time (FT) binary parameter, a value of a parameter that is indicative of a current length of an EOM (current_EOML), and a value of a parameter that is indicative of a current length of the input message (current_IML). Each of these values may be obtained at block 202 via a software issued processing instruction.

At block 204, computer-executable instructions of the XOF execution module(s) may be executed to determine whether the value of the FT binary parameter indicates that a function (e.g., an XOF) has been executed for a first time. As depicted in FIG. 2, a negative determination at block 204 may indicate the XOF has not yet been executed for a first time, whereas a positive determination at block 204 may indicate the opposite—that the XOF has been executed for a first time. While the FT parameter having a value of 1 is illustratively depicted in FIG. 2 as indicating that the XOF has been executed for a first time, it should be appreciated that in alternative example embodiments, an FT parameter value of 0 may instead indicate the XOF has been executed for a first time.

In response to a positive determination at block 204 indicating that the XOF has been executed for a first time, the method 200 may proceed to block 206, where computer-executable instructions of the XOF execution module(s) may be executed to obtain an initial length of the EOM (initial_EOML) via a software issued processing instruction. From block 206, the method 200 may proceed to block 208, where the XOF may be executed for a first time. Execution of the XOF (e.g., the SHAKE function) for the first time may not result in generation of the padded message block(s) 114(1)-114(S). Rather, generation of the padded message block(s) 114(1)-114(S) may occur before the method 200 of FIG. 2. Alternatively, the padded message block(s) 114(1)-114(S) may be generated after the last full input message block is processed, at which point, the process is pointing to the either a partial input message block or an empty input message block (which follows the last (full) input message block. In addition, at block 208, computer-executable instructions of the XOF execution module(s) may be executed to set the FT parameter to an opposing value (e.g., 0) to indicate that the XOF has been executed for a first time; to save the value of the initial_EOML parameter as the value of a parameter saved_EOML, and to set a Padded_Block# parameter to a value corresponding to the number of padded message blocks 114(1)-114(S) that were generated.

The method 200 may proceed to block 210 from block 208. The method 200 may also proceed to block 210 in response to a negative determination at block 204, which would indicate that the XOF has already been executed a first time. At block 210, computer-executable instructions of the XOF execution module(s) may be executed to compare the value of current_EOML to the value of saved_EOML. If the value of current_EOML is not less than the value of saved_EOML (a negative determination at block 210), this would indicate the processing of the EOM blocks 118(1)-118(Z) has not yet been initiated.

In response to a negative determination at block 210, the method 200 may proceed to block 212, where computer-executable instructions of the XOF execution modules may be executed to compare a value of current_IML to a length of each input message block in the input message 100 (IBL) to determine whether current_IML is less than IBL. In response to a negative determination at block 212—which indicates that one or more input message blocks in the input message 100 remain to be processed—the method 200 may proceed to block 214. At block 214, computer-executable instructions of one or more input message block processing modules may be executed to process one or more input message blocks of the input message 100 and to decrement a value of current_IML by the number of input message bytes that are processed.

On the other hand, in response to a positive determination at block 212—which indicates that all the full input message blocks 102(1)-102(N) that contain input data in every bit of every byte have been processed—the method 200 may proceed to block 216. At block 216, computer-executable instructions of one or more padded message block processing modules may be executed to process a padded message block, set current_IML to a zero value, and decrement the value of Padded_Block# by 1.

From block 216, the method 200 may proceed to block 218, where computer-executable instructions of the padded message block processing module(s) may be executed to determine whether the Padded_Block# parameter has a value of 0. In response to a negative determination at block 218—which indicates that one or more of the padded message blocks 114(1)-114(S) remain to be processed—the method 200 may again proceed to block 216. The operations of blocks 216 and 218 may be performed iteratively until a positive determination is made at block 218, at which point, all padded message blocks 114(1)-114(S) have been processed.

From block 218, the method 200 may proceed to block 220. At block 220, computer-executable instructions of one or more EOM block processing modules may be executed to store the output of processing the padded message blocks 114(1)-114(S) of the padded message in a first EOM block. In addition, at block 220, computer-executable instructions of the EOM block processing module(s) may be executed to set current_IML to 0 and to decrement current_EOML by a number of bytes in the output stored in the first EOM block.

From block 220, the method 200 may proceed to block 222, where computer-executable instructions of the EOM block processing module(s) may be executed to process a first one or more EOM blocks, store the output of the processing in a second one or more EOM blocks that are ordered after the first one or more EOM blocks in the EOM, and decrement current_EOML by the number of bytes stored in the second one or more EOM blocks. After the operations at block 222 are performed, the current iteration of the method 200 may end.

Referring again to block 210, in response to a positive determination at block 210, the method 200 may proceed directly to block 222. A positive determination at block 210 may indicate that processing of one or more EOM blocks has already occurred. As such, in response to a positive determination at block 210, the method 200 may proceed with processing of additional EOM block(s) at block 222.

Example embodiments of the disclosure provide various technical features, technical effects, and/or improvements to technology. For instance, example embodiments of the disclosure provide the technical effect of ensuring that message padding is performed only once for an input message and the technical effect of ensuring that all padded message block(s) are processed. These technical effects constitute an inventive concept over conventional processing techniques by eliminating the risk associated with such techniques that one or more padded message blocks are not processed when multiple padded message blocks have been generated. These technical effects are achieved at least in part by the technical features of comparing and adjusting the values of multiple parameters to determine whether and when to initiate processing of blocks of the input message, the padded message, or the EOM at each processing stage (e.g., upon receipt of each software issued instruction). The above-mentioned technical effects individually and together constitute an improvement to the functioning of a computer, in particular, an improvement to the functioning of a computer that is executing a function (e.g., an XOR) on an input message, a padded message, and optionally, an EOM. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 3:
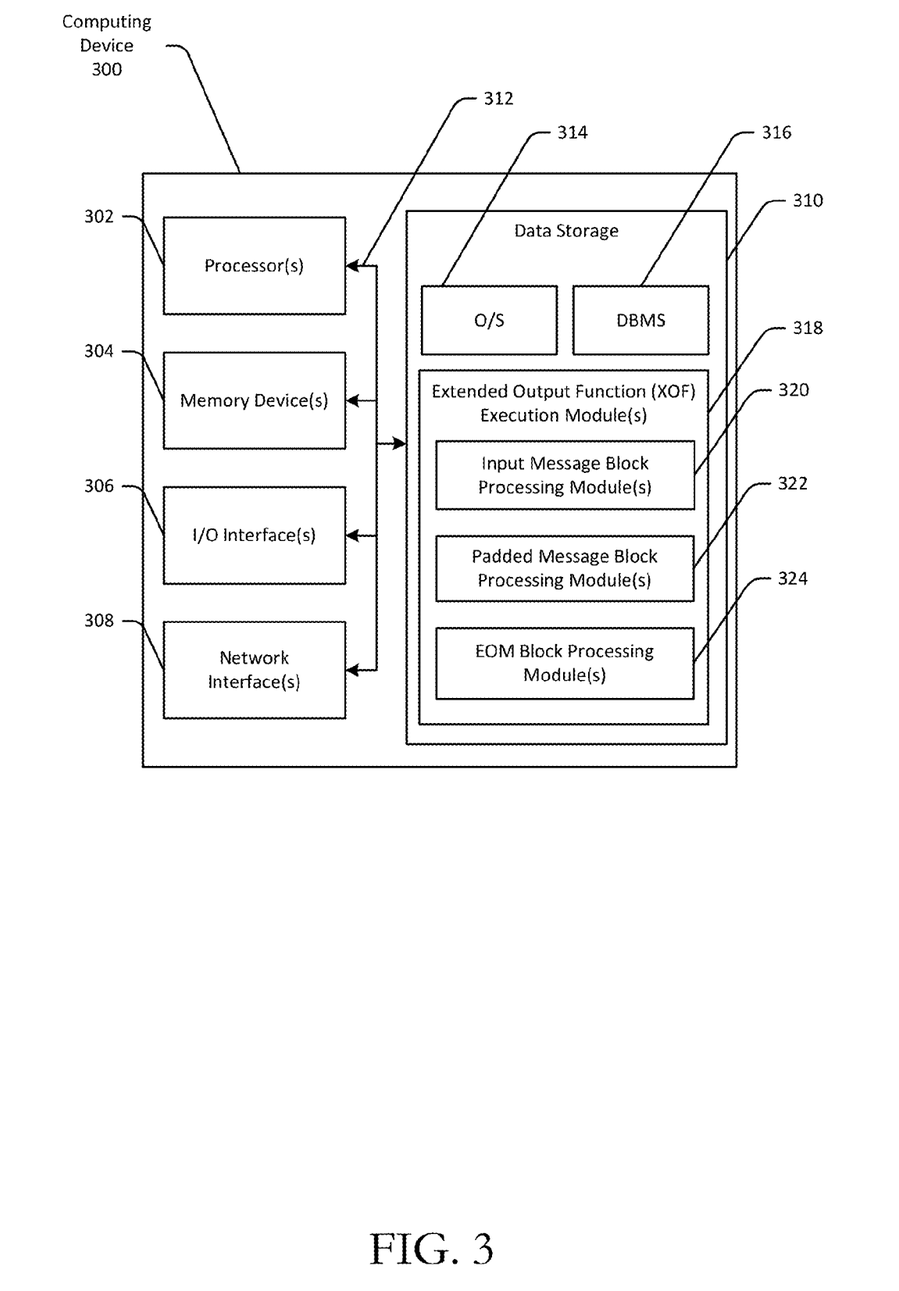
FIG. 3 is a schematic diagram of an illustrative computing device configured to implement one or more example embodiments of the disclosure.

FIG. 3 is a schematic diagram of an illustrative computing device 300 configured to implement one or more example embodiments of the disclosure. While the device 300 may be described herein in the singular, it should be appreciated that multiple instances of the device 300 may be provided, and functionality described in connection with the device 300 may be distributed across such multiple instances.

In an illustrative configuration, the device 300 may include one or more processors (processor(s)) 302, one or more memory devices 304 (generically referred to herein as memory 304), one or more input/output ("I/O") interface(s) 306, one or more network interfaces 308, and data storage 310. The device 300 may further include one or more buses 312 that functionally couple various components of the device 300.

The bus(es) 312 may include at least one of a system bus, a memory bus, an address bus, or a message bus, and may permit the exchange of information (e.g., data (including computer-executable code), signaling, etc.) between various components of the device 300. The bus(es) 312 may include, without limitation, a memory bus or a memory controller, a peripheral bus, an accelerated graphics port, and so forth. The bus(es) 312 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 304 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 310 may include removable storage and/or non-removable storage including, but not limited to, magnetic storage, optical disk storage, and/or tape storage. The data storage 310 may provide non-volatile storage of computer-executable instructions and other data. The memory 304 and the data storage 310, removable and/or non-removable, are examples of computer-readable storage media (CRSM) as that term is used herein.

The data storage 310 may store computer-executable code, instructions, or the like that may be loadable into the memory 304 and executable by the processor(s) 302 to cause the processor(s) 302 to perform or initiate various operations. The data storage 310 may additionally store data that may be copied to memory 304 for use by the processor(s) 302 during the execution of the computer-executable instructions. Moreover, output data generated as a result of execution of the computer-executable instructions by the processor(s) 302 may be stored initially in memory 304 and may ultimately be copied to data storage 310 for non-volatile storage.

More specifically, the data storage 310 may store one or more operating systems (O/S) 314; one or more database management systems (DBMS) 316 configured to access the memory 404 and/or one or more external data store(s) (not shown); and one or more program modules, applications, engines, computer-executable code, scripts, or the like such as, for example, one or more XOF execution modules 318. The XOF execution module(s) 318 may, in turn, include various sub-modules such as one or more input message block processing modules 320, one or more padded message block processing modules 322, and one or more EOM block processing modules 324. Any of the components depicted as being stored in data storage 310 may include any combination of software, firmware, and/or hardware. The software and/or firmware may include computer-executable instructions (e.g., computer-executable program code) that may be loaded into the memory 404 for execution by one or more of the processor(s) 302 to perform any of the operations described earlier in connection with correspondingly named modules.

Although not depicted in FIG. 4, the data storage 310 may further store various types of data utilized by components of the device 300 (e.g., input message data; pointer data; output data from the processing of message blocks of an input message, padded message, and/or an EOM; padding signature data, message digest data, etc.). Any data stored in the data storage 310 may be loaded into the memory 304 for use by the processor(s) 302 in executing computer-executable instructions. In addition, any data stored in the data storage 310 may potentially be stored in external data store(s) and may be accessed via the DBMS 316 and loaded in the memory 304 for use by the processor(s) 302 in executing computer-executable instructions.

The processor(s) 302 may be configured to access the memory 304 and execute computer-executable instructions loaded therein. For example, the processor(s) 302 may be configured to execute computer-executable instructions of the various program modules, applications, engines, or the like of the device 300 to cause or facilitate various operations to be performed in accordance with one or more embodiments of the disclosure. The processor(s) 302 may include any suitable processing unit capable of accepting data as input, processing the input data in accordance with stored computer-executable instructions, and generating output data. The processor(s) 302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 302 may be capable of supporting any of a variety of instruction sets.

Referring now to other illustrative components depicted as being stored in the data storage 310, the O/S 314 may be loaded from the data storage 310 into the memory 404 and may provide an interface between other application software executing on the device 300 and hardware resources of the device 300. More specifically, the O/S 314 may include a set of computer-executable instructions for managing hardware resources of the device 300 and for providing common services to other application programs. In certain example embodiments, the O/S 314 may include or otherwise control execution of one or more of the program modules depicted as being stored in the data storage 310. The O/S 314 may include any operating system now known or which may be developed in the future including, but not limited to, any server operating system, any mainframe operating system, or any other proprietary or non-proprietary operating system.

The DBMS 316 may be loaded into the memory 304 and may support functionality for accessing, retrieving, storing, and/or manipulating data stored in the memory 304, data stored in the data storage 310, and/or data stored in external data store(s). The DBMS 316 may use any of a variety of database models (e.g., relational model, object model, etc.) and may support any of a variety of query languages. The DBMS 316 may access data represented in one or more data schemas and stored in any suitable data repository. External data store(s) that may be accessible by the device 300 via the DBMS 316 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 300, the input/output (I/O) interface(s) 306 may facilitate the receipt of input information by the device 300 from one or more I/O devices as well as the output of information from the device 300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 300 or may be separate. The I/O devices may further include, for example, any number of peripheral devices such as data storage devices, printing devices, and so forth.

The I/O interface(s) 306 may also include an interface for an external peripheral device connection such as universal serial bus (USB), FireWire, Thunderbolt, Ethernet port or other connection protocol that may connect to one or more networks. The I/O interface(s) 306 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 300 may further include one or more network interfaces 308 via which the device 300 may communicate with any of a variety of other systems, platforms, networks, devices, and so forth. The network interface(s) 308 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules depicted in FIG. 3 as being stored in the data storage 310 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the device 300 and/or hosted on other computing device(s) accessible via one or more networks, may be provided to support functionality provided by the modules depicted in FIG. 3 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of devices 300 in accordance with any suitable computing model such as, for example, a client-server model, a peer-to-peer model, and so forth. In addition, any of the functionality described as being supported by any of the modules depicted in FIG. 3 may be implemented, at least partially, in hardware and/or firmware across any number of devices.

It should further be appreciated that the device 300 may include alternate and/or additional hardware, software, or firmware components beyond those described or depicted without departing from the scope of the disclosure. More particularly, it should be appreciated that software, firmware, or hardware components depicted as forming part of the device 300 are merely illustrative and that some components may not be present or additional components may be provided in various embodiments. While various illustrative modules have been depicted and described as software modules stored in data storage 310, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 may be performed by a device having the illustrative configuration depicted in FIG. 3, or more specifically, by one or more program modules, engines, applications, or the like executable on such a device. It should be appreciated, however, that such operations may be implemented in connection with numerous other device configurations.

The operations described and depicted in the illustrative method of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for processing an input message using an extended output function to obtain a message digest, the method comprising:
   determining a value of a binary parameter indicative of whether the extended output function has been executed a first time;
   determining a value of a first parameter indicative of a current length of an extended output message (EOM);
   determining a value of a second parameter indicative of a current length of the input message; and
   processing one of the input message, a padded message comprising multiple padded message blocks, or the EOM based at least in part on at least one of the value of the binary parameter, the value of the first parameter, or the value of the second parameter to obtain the message digest, wherein the processing comprises:
      determining, based at least in part on the value of the second parameter, that processing of the input message has completed,
      determining, based at least in part on the value of the first parameter, that processing of the EOM has not begun; and
      processing each of the multiple padded message blocks a single time to ensure that the message digest is accurate.

2. The computer-implemented method of claim 1, further comprising:
   determining that the value of the binary parameter indicates that the extended output function has not been executed a first time;
   determining an initial length of the EOM;
   executing the extended output function;
   setting the binary parameter to a value that indicates the extended output function has been executed a first time;
   setting a third parameter to the initial length of the EOM; and
   setting a fourth parameter to a value equal to a number of one or more padded message blocks in the padded message.

3. The computer-implemented method of claim 1, further comprising:
  determining that the value of the binary parameter indicates that the extended output function has been executed a first time;
  determining that the value of the first parameter is less than a value of a third parameter indicative of an initial length of the EOM;
  processing a first one or more EOM blocks of the EOM to obtain an output;
  storing the output in a second one or more EOM blocks of the EOM, the second one or more EOM blocks being ordered after the first one or EOM blocks in the EOM; and
  decrementing the value of the first parameter by a number of bytes in the output stored in the second one or more EOM blocks.

4. The computer-implemented method of claim 1, further comprising:
  determining that the value of the binary parameter indicates that the extended output function has been executed a first time;
  determining that the value of the first parameter is not less than a value of a third parameter indicative of an initial length of the EOM;
  determining whether the value of the second parameter is less than a length of each input message block in the input message; and
  processing one of at least a portion of the input message or at least a portion of the padded message based at least in part on the determining whether the value of the second parameter is less than a length of each input message block in the input message.

5. The computer-implemented method of claim 4, wherein determining whether the value of the second parameter is less than a length of each input message block in the input message comprises determining that the value of the second parameter is less than the length of each input message block, the method further comprising:
  processing a padded message block of one or more padded message blocks of the padded message;
  setting the second parameter to a zero value; and
  decrementing a value of a third parameter indicative of a number of the one or more padded message blocks remaining to be processed by one.

6. The computer-implemented method of claim 5, further comprising:
  determining that the value of the third parameter is zero;
  storing a first output of the processing of the padded message block in a first EOM block of the EOM;
  setting the second parameter to a zero value;
  decrementing the value of the first parameter by a number of bytes in the first output;
  processing a first one or more EOM blocks of the EOM to obtain a second output, the first one or more EOM blocks comprising the first EOM block;
  storing the second output in a second one or more EOM blocks of the EOM, the second one or more EOM blocks being ordered after the first one or EOM blocks in the EOM; and
  decrementing the value of the first parameter by a number of bytes in the second output.

7. The computer-implemented method of claim 1, wherein determining whether the value of the second parameter is less than a length of each input message block in the input message comprises determining that the value of the second parameter is not less than the length of each input message block, the method further comprising:
  processing one or more input message blocks of the input message; and
  decrementing the value of the second parameter by a number of bytes in the one or more input message blocks that we processed.

8. A system for processing an input message using an extended output function to obtain a message digest, the system comprising:
  at least one memory storing computer-executable instructions; and
  at least one processor configured to access the at least one memory and execute the computer-executable instructions to:
    determine a value of a binary parameter indicative of whether the extended output function has been executed a first time;
    determine a value of a first parameter indicative of a current length of an extended output message (EOM);
    determine a value of a second parameter indicative of a current length of the input message; and
    process one of the input message, a padded message comprising multiple padded message blocks, or the EOM based at least in part on at least one of the value of the binary parameter, the value of the first parameter, or the value of the second parameter to obtain the message digest, wherein the processing comprises:
      determining, based at least in part on the value of the second parameter, that processing of the input message has completed;
      determining, based at least in part on the value of the first parameter, that processing of the EOM has not begun; and
      processing each of the multiple padded message blocks a single time to ensure that the message digest is accurate.

9. The system of claim 8, wherein the at least one processor is further configured to execute the computer-executable instructions to:
  determine that the value of the binary parameter indicates that the extended output function has not been executed a first time;
  determine an initial length of the EOM;
  execute the extended output function;
  set the binary parameter to a value that indicates the extended output function has been executed a first time;
  set a third parameter to the initial length of the EOM; and
  set a fourth parameter to a value equal to a number of one or more padded message blocks in the padded message.

10. The system of claim 8, wherein the at least one processor is further configured to execute the computer-executable instructions to:
  determine that the value of the binary parameter indicates that the extended output function has been executed a first time;
  determine that the value of the first parameter is less than a value of a third parameter indicative of an initial length of the EOM;
  process a first one or more EOM blocks of the EOM to obtain an output;
  store the output in a second one or more EOM blocks of the EOM, the second one or more EOM blocks being ordered after the first one or EOM blocks in the EOM; and decrement the value of the first parameter by a number of bytes in the output stored in the second one or more EOM blocks.

11. The system of claim 8, wherein the at least one processor is further configured to execute the computer-executable instructions to:
   determine that the value of the binary parameter indicates that the extended output function has been executed a first time;
   determine that the value of the first parameter is not less than a value of a third parameter indicative of an initial length of the EOM;
   determine whether the value of the second parameter is less than a length of each input message block in the input message; and
   process one of at least a portion of the input message or at least a portion of the padded message based at least in part on the determining whether the value of the second parameter is less than a length of each input message block in the input message.

12. The system of claim 11, wherein the at least one processor is configured to determine whether the value of the second parameter is less than a length of each input message block in the input message by executing the computer-executable instructions to determine that the value of the second parameter is less than the length of each input message block, and wherein the at least one processor is further configured to execute the computer-executable instructions to:
   process a padded message block of one or more padded message blocks of the padded message;
   set the second parameter to a zero value; and
   decrement a value of a third parameter indicative of a number of the one or more padded message blocks remaining to be processed by one.

13. The system of claim 12, wherein the at least one processor is further configured to execute the computer-executable instructions to:
   determine that the value of the third parameter is zero;
   store a first output of the processing of the padded message block in a first EOM block of the EOM;
   set the second parameter to a zero value;
   decrement the value of the first parameter by a number of bytes in the first output;
   process a first one or more EOM blocks of the EOM to obtain a second output, the first one or more EOM blocks comprising the first EOM block;
   store the second output in a second one or more EOM blocks of the EOM, the second one or more EOM blocks being ordered after the first one or EOM blocks in the EOM; and
   decrement the value of the first parameter by a number of bytes in the second output.

14. The system of claim 8, wherein the at least one processor is configured to determine whether the value of the second parameter is less than a length of each input message block in the input message by executing the computer-executable instructions to determine that the value of the second parameter is not less than the length of each input message block, and wherein the at least one processor is further configured to execute the computer-executable instructions to:
   process one or more input message blocks of the input message; and
   decrement the value of the second parameter by a number of bytes in the one or more input message blocks that we processed.

15. A computer program product for processing an input message using an extended output function to obtain a message digest, the computer program product comprising a non-transitory storage medium readable by a processing circuit, the storage medium storing instructions executable by the processing circuit to cause a method to be performed, the method comprising:
   determining a value of a binary parameter indicative of whether the extended output function has been executed a first time;
   determining a value of a first parameter indicative of a current length of an extended output message (EOM);
   determining a value of a second parameter indicative of a current length of the input message; and
   processing one of the input message, padded message comprising multiple padded message blocks, or the EOM based at least in part on at least one of the value of the binary parameter, the value of the first parameter, or the value of the second parameter to obtain the message digest, wherein the processing comprises:
      determining, based at least in part on the value of the second parameter, that processing of the input message has completed;
      determining, based at least in part on the value of the first parameter, that processing of the EOM has not begun; and
      processing each of the multiple padded message blocks a single time to ensure that the message digest is accurate.

16. The computer program product of claim 15, the method further comprising:
   determining that the value of the binary parameter indicates that the extended output function has not been executed a first time;
   determining an initial length of the EOM;
   executing the extended output function;
   setting the binary parameter to a value that indicates the extended output function has been executed a first time;
   setting a third parameter to the initial length of the EOM; and
   setting a fourth parameter to a value equal to a number of one or more padded message blocks in the padded message.

17. The computer program product of claim 15, the method further comprising:
   determining that the value of the binary parameter indicates that the extended output function has been executed a first time;
   determining that the value of the first parameter is less than a value of a third parameter indicative of an initial length of the EOM;
   processing a first one or more EOM blocks of the EOM to obtain an output;
   storing the output in a second one or more EOM blocks of the EOM, the second one or more EOM blocks being ordered after the first one or EOM blocks in the EOM; and
   decrementing the value of the first parameter by a number of bytes in the output stored in the second one or more EOM blocks.

18. The computer program product of claim 15, the method further comprising:
   determining that the value of the binary parameter indicates that the extended output function has been executed a first time;

determining that the value of the first parameter is not less than a value of a third parameter indicative of an initial length of the EOM;

determining whether the value of the second parameter is less than a length of each input message block in the input message; and processing one of at least a portion of the input message or at least a portion of the padded message based at least in part on the determining whether the value of the second parameter is less than a length of each input message block in the input message.

19. The computer program product of claim 18, wherein determining whether the value of the second parameter is less than a length of each input message block in the input message comprises determining that the value of the second parameter is less than the length of each input message block, the method further comprising:

processing a padded message block of one or more padded message blocks of the padded message;

setting the second parameter to a zero value; and decrementing a value of a third parameter indicative of a number of the one or more padded message blocks remaining to be processed by one.

20. The computer program product of claim 15, the method further comprising:

determining that the value of the third parameter is zero;

storing a first output of the processing of the padded message block in a first EOM block of the EOM;

setting the second parameter to a zero value;

decrementing the value of the first parameter by a number of bytes in the first output;

processing a first one or more EOM blocks of the EOM to obtain a second output, the first one or more EOM blocks comprising the first EOM block;

storing the second output in a second one or more EOM blocks of the EOM, the second one or more EOM blocks being ordered after the first one or EOM blocks in the EOM; and decrementing the value of the first parameter by a number of bytes in the second output.

\* \* \* \* \*